INVENTOR.
William J. Belknap

April 21, 1953 W. J. BELKNAP 2,635,278
FLOOR DRYING APPARATUS CONTAINING BAFFLE STRUCTURE
FOR SEPARATION OF ENTRAINED LIQUID
Filed Aug. 18, 1951 4 Sheets-Sheet 3
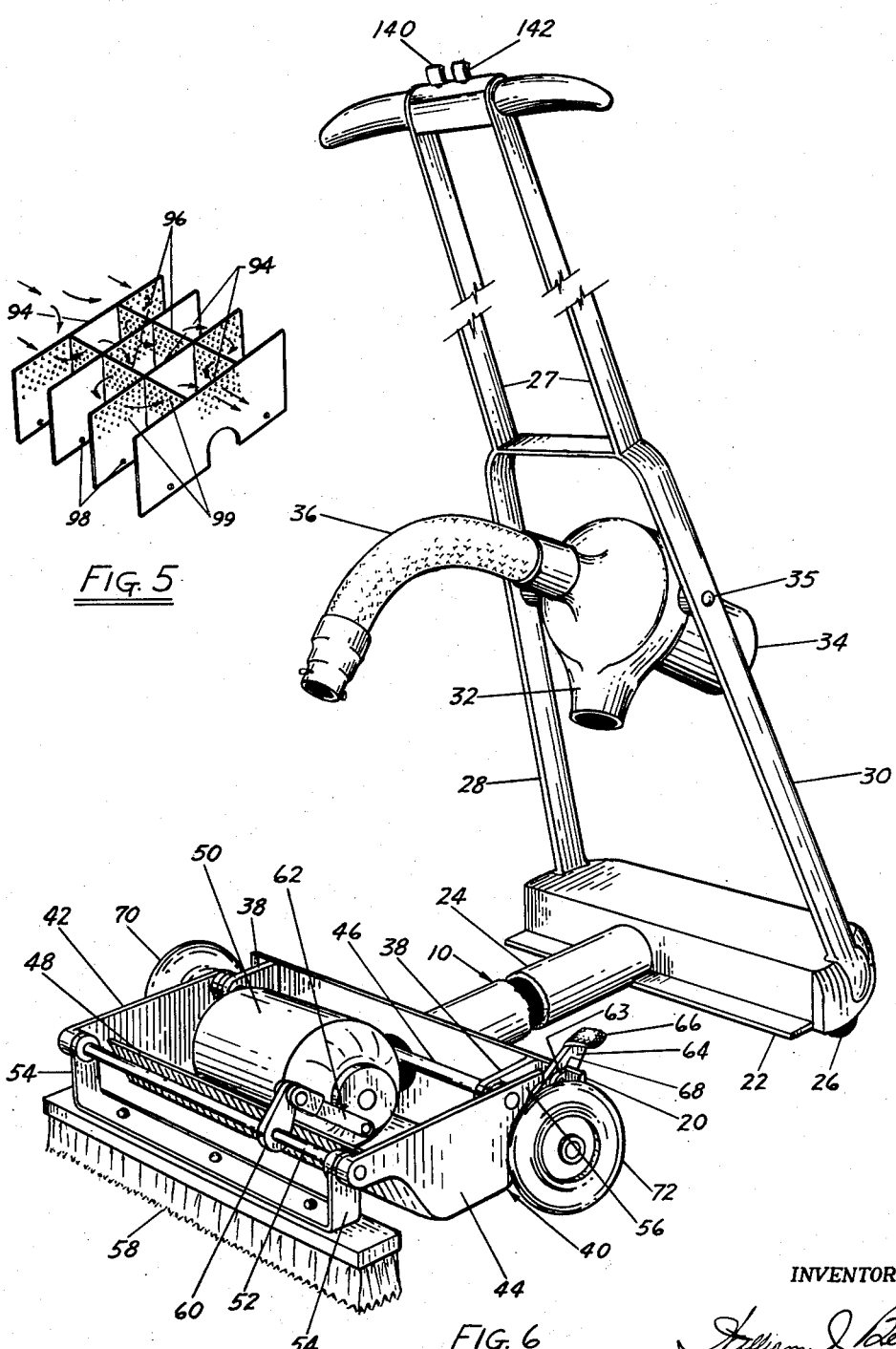
INVENTOR.
William J. Belknap April 21, 1953 W. J. BELKNAP 2,635,278
FLOOR DRYING APPARATUS CONTAINING BAFFLE STRUCTURE
FOR SEPARATION OF ENTRAINED LIQUID
Filed Aug. 18, 1951 4 Sheets-Sheet 4

INVENTOR.
William J. Belknap

Patented Apr. 21, 1953

2,635,278

UNITED STATES PATENT OFFICE 2,635,278

FLOOR DRYING APPARATUS CONTAINING BAFFLE STRUCTURE FOR SEPARATION OF ENTRAINED LIQUID

William J. Belknap, Framingham, Mass.

Application August 18, 1951, Serial No. 242,487

3 Claims. (Cl. 15—353)

This invention relates generally to floor cleaning equipment, and particularly to improvements in floor scrubbing and/or drying devices of the general type described in my copending application Serial No. 8,533, filed February 16, 1948, of which this application is a continuation-in-part.

One of the objects of this invention is to provide a compact device adapted to be handled with a minimum of effort on the part of the user and equipped with means for scrubbing a floor surface or the like and with means for drying the scrubbed floor surface.

Another object of this invention is to provide a scrubbing device of the type described above with self-contained suction means, and conduit means communicating between said suction means and the floor drying means, all so arranged that when the floor drying means is being operated, the suction means can be put into operation and the liquid collected by the floor drying means can be sucked up off the floor and deposited in the housing.

A still further important feature of this invention is the arrangement of the conduit means between the suction means and the intake port in the housing in a manner such that the liquid cleaner on the floor surface is not only sucked into the housing during the drying operation with the application of a minimum pressure differential, but in addition, liquid is prevented from being carried by the airstream into the suction means even in cases where the suction force is relatively great. In accordance with this invention, this carry-over of liquid into the suction means is prevented by special arrangements and configurations of the above-mentioned conduit means, including in particular a tortuous or serpentine passageway into which the intake airstream discharges, of such cross-sectional area and configuration that liquid is flung or forced out of the airstream by abrupt changes in direction and/or rate of flow in traversing the passageway; settling space or spaces of relatively large cross-sectional area between the intake port and the suction means to promote settling out from the airstream of droplets of liquid; baffle or like means for preventing slopping and turbulence of the body of liquid collected in the bottom of the housing, thus preventing particles of said body of liquid from being picked up by the airstream; and, if desired, means for shielding the opening leading to the suction means against creeping of liquid along the interior walls of the housing and thence into said opening.

Still another advantageous feature of this invention is the provision of means for collecting the liquid cleaner at the intake port adjacent the floor-drying means during the drying operation by a squeegee secured to the housing in a position such that it actually forms the inner (i. e. rear) side of the intake port. The design is such that all of the liquid cleaner collected by the squeegee is directly subjected to the action of the suction and is quickly sucked into the housing.

The foregoing as well as other objects will be made more apparent as this description proceeds, especially when considered in connection with the accompanying drawings, wherein:

Fig. 5 is a perspective view of the baffle grid structure;

Fig. 6 is an enlarged perspective view of the device with the liquid-carrying tanks removed;

Figure 1:
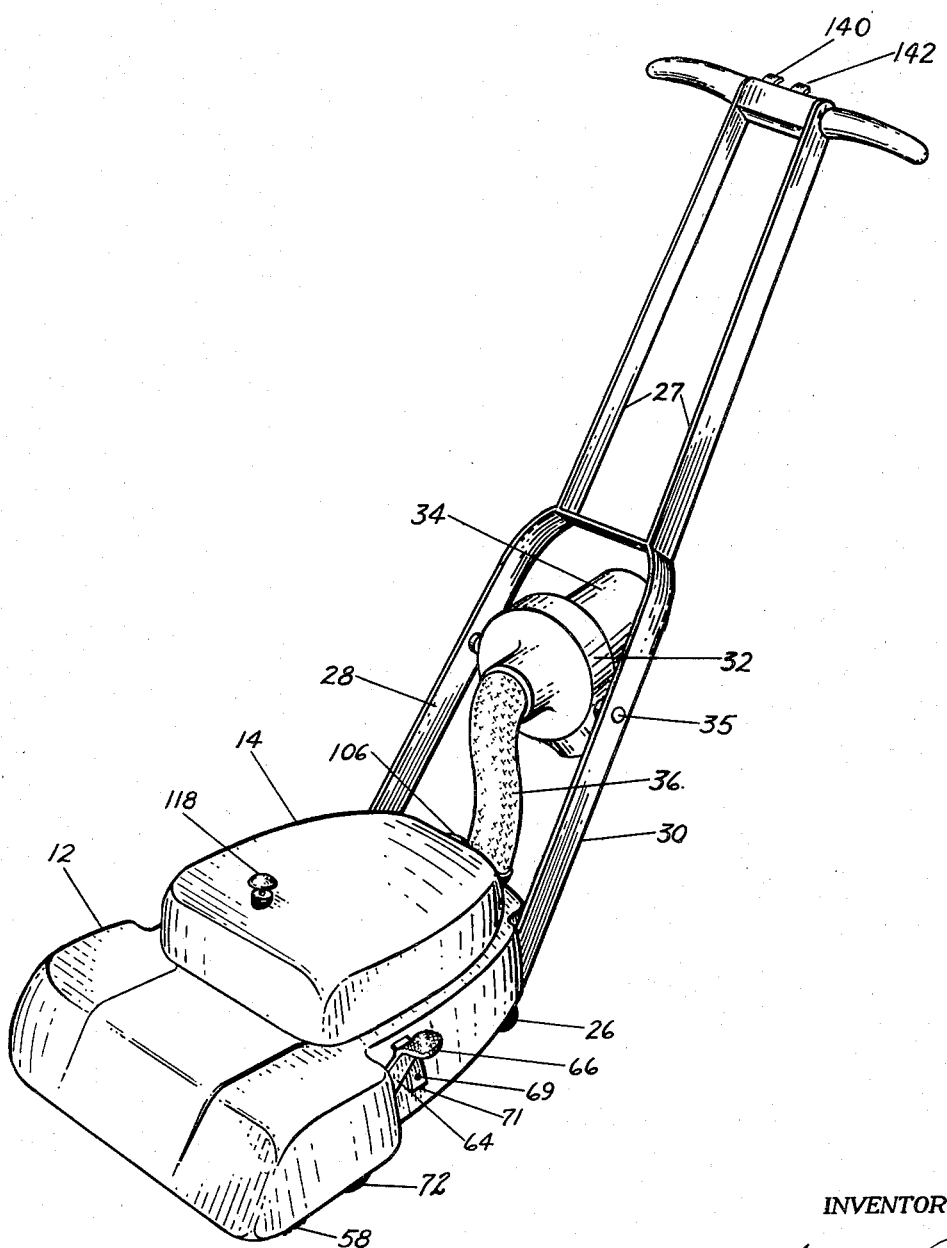
Fig. 1 is a perspective view of the scrubbing device of this invention.
Figure 4:
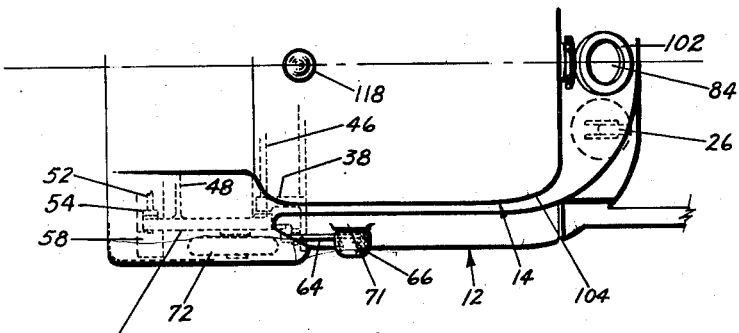
Fig. 4 is a plan view of one side of the device.
Figure 3:
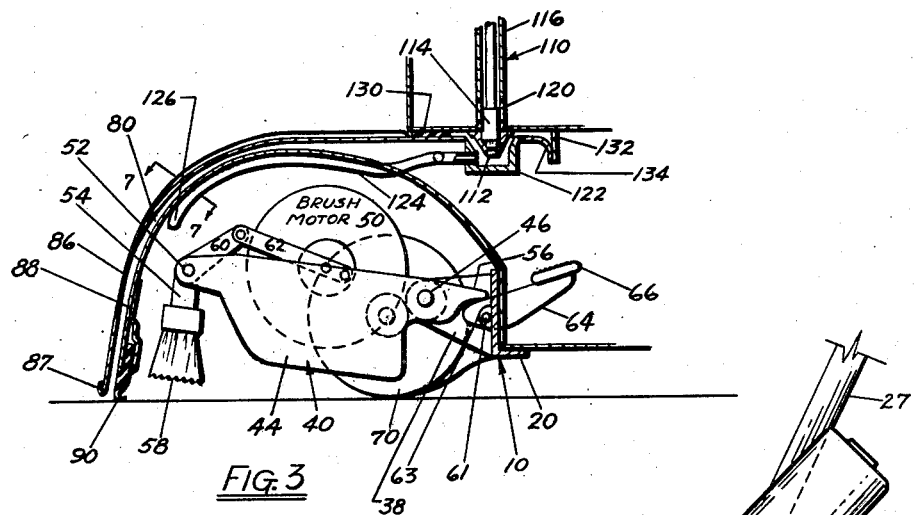
Fig. 3 is an enlarged vertical sectional view of the front part of the device as shown in Fig. 2 but with the brush retracted and the floor-drying squeegee in operating position, the brush assembly being shown in elevation.

The apparatus shown in the drawings may conveniently consist of three main units or assemblies, viz. the washer chassis 10 as shown in Fig. 6, the lift-out waste tank assembly represented by the numeral 12, and the liquid supply tank assembly represented by the numeral 14. The waste tank assembly 12 fits down into chassis 10, and supply tank assembly 14 fits onto the top of waste tank assembly 12. Each of these three assemblies will now be described in detail.

Chassis assembly 10 comprises front frame member 20 and rear frame member 22, rigidly connected by tubular shaft 24. Rear frame member 22 is supported upon two swivel casters 26, and to it is attached a yoked handle 27 having arms 28, 30. This handle is so pivoted in conventional manner that on lowering it sufficiently, the front part of the entire assembly may be raised from the floor and the device may be wheeled around on the swivel casters 26. Suction blower 32 and motor 34 which drives the blower are pivotally mounted by means of pins 35 in the forked handle. Flexible hose 36 provides communication between the blower 32 and the waste tank interior, as described hereinafter.

Figure 9:
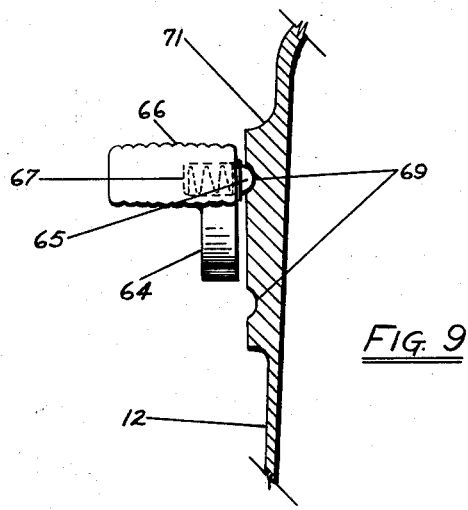
Fig. 9 is an enlarged view partly in section of the treadle stop arrangement looking toward the front of the device.

Front frame member 20 carries arms 38 on which is mounted the brush sub-assembly represented by the numeral 40. This sub-assembly comprises supporting side plates 42, 44, swingably pivoted to arms 38 by pin 46 and rigidly joined together by the curved support plate 48 which extends beneath the brush motor 50. Side plates 42, 44 carry the brush support bar 52, to which is rigidly attached bracket 54, rigidly supporting brush 58. Link member 60, also rigidly attached to bar 52, is connected to the drive shaft of brush motor 50 through any convenient linking and gear arrangement including for example link 62 to provide whatever speed and amplitude of oscillation of brush 50 may be desired. Either of the side plates 42 or 44 is provided with a rearward extension 56, here shown as being attached to plate 44, as an engaging member for a treadle arm 64 which terminates in a treadle 66. Treadle arm 64 is pivoted to front frame member 20 by pin 61 which pivots in lug 63 attached to member 20. A slot 68 is provided in frame member 20 through which treadle arm 64 protrudes. Treadle 66 is provided with a stop 65 which is urged outwardly by spring 67 to engage in one or the other of holes 69 in a raised portion 71 on the side of waste tank assembly 12 (see Figs. 1 and 9).

The front part of the frame is supported by wheels 70, 72 pivoted on side plates 42, 44 respectively.

The entire brush assembly 40 may be removed from arms 38 by withdrawing pin 46, which is preferably arranged to be easily removable for that purpose.

Figure 8:
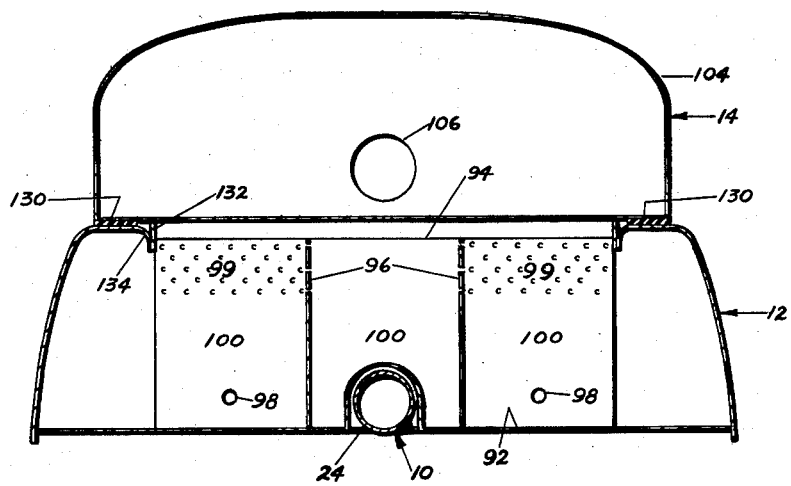
Fig. 8 is an enlarged vertical cross-sectional view of the device through the tanks taken along the line 8—8 of Fig. 2.
Figure 7:
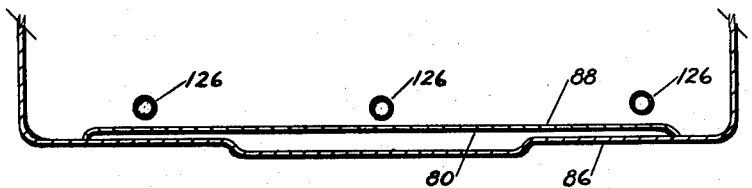
Fig. 7 is a sectional view along the line 7—7 of Fig. 3 showing details of the air and liquid intake.

The lift-out waste tank assembly 12 comprises air and liquid intake snout 80, a main chamber 82, and an opening 84 into which the lower end of flexible hose 36 is inserted. Snout 80 has a front wall 86 with a lower edge 87, and a rear wall 88, the latter terminating at its bottom end in squeegee 90. Snout 80 opens out rearwardly into main chamber 82, in which is positioned baffle means which serves two purposes—prevention of any appreciable surging or slopping around of the liquid in chamber 82, and removing as much as possible of the liquid carried in from snout 80. The former purpose is accomplished by baffles extending upwardly from the bottom 92 of chamber 82. The latter purpose is accomplished by providing tortuous or serpentine passageways for the air and liquid stream emerging into chamber 82 from snout 80, and in addition suitable settling spaces of large cross-sectional area relative to that of snout 80, so that liquid droplets may settle out. The arrangement shown in my copending application Serial No. 8,533 above referred to may be employed for this purpose. The arrangement shown herein, which is an "egg-box" type grid of generally vertically extending baffles 94 and 96, baffles 94 being at right angles to baffles 96, possesses certain advantages thereover, however. These baffles may fit loosely at the bottom, and/or be provided with a few holes 98, so that liquid accumulating in the bottom will be able to flow relatively slowly from one compartment to another to reach a common level but without surging or slopping. The top portions of the baffles are perforated in selected areas as shown by the numeral 99 in Figs. 5 and 8 to provide a tortuous path, rather than a direct front-to-rear path, for the air and liquid stream emerging from snout 80, so that droplets are flung out from the stream in its twisting course. Passage of the stream through the perforations 99 also serves to throw out liquid droplets, and the several sub-chambers 100 formed by the baffles also serve as settling chambers, since their area is large compared with that of either snout 80 or the perforated areas of the baffles.

Opening 84 may be conveniently provided with a circumferential lip 102, which serves to prevent creep of any liquid along the walls of waste tank chamber 82 into opening 84.

Liquid supply tank assembly 14 comprises a tank 104, filler opening 106 and cap 108 therefor, and slide valve unit 110. This latter unit comprises an opening 112 in the bottom of tank 104, controlled by valve 114 mounted in housing 116 and operated by push-pull handle 118. Ports 120 in housing 116 admit liquid from tank 104 to opening 112 when valve 114 is raised by handle 118, and lowering of the valve closes ports 120 and opening 112.

The opening 112 discharges liquid from tank 104 into a well 122 located in the upper part of waste tank assembly 12, and the liquid travels from well 122 through conduit 124 to discharge openings 126, of which there may be any convenient number, located above brush 58.

Tank 104 may conveniently rest on a gasket 130, and it is held in position by suitable downwardly-projecting lugs or flanges 132 which are positioned to be in sliding contact with edges 134 of the open top of main chamber 82 of the waste tank.

Two switches 140 and 142 are provided on handle 27, in a position convenient for the operator. These switches lead by an electric cord from a plug (not shown) which can be plugged in to a source of electric current such as any convenience outlet, in conventional manner, e. g. as is customary in vacuum cleaners. One of these switches (say 140) controls the power supply to motor 34, the other (say 142) controls the power supply to brush motor 50. The wires leading to the latter may pass conveniently through tubular shaft 24.

Figure 2:
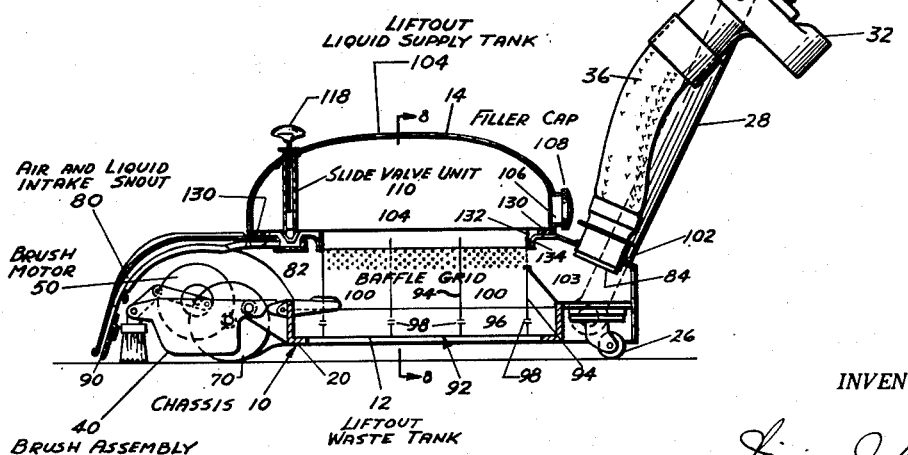
Fig. 2 is a vertical sectional view of the device taken generally along the central lengthwise axis with parts omitted, and with the floor-scrubbing brush in operating position, the brush assembly being shown in elevation.

Operation of the unit, starting from empty conditions, may be carried out as follows: Liquid supply tank assembly 14 is lifted off and tank 104 is filled through opening 106 with suitable cleaning liquid; e. g. an aqueous soap or detergent solution. Valve 114 is in closed position at the time. Tank 104 is then replaced into position, and the device may be wheeled to the place of use by first depressing handle 27 until the front wheels 70, 72 lift off the floor and then wheeling the device, supported by swivel casters 26, to the desired location. Then, with treadle 66 in the down position (Fig. 2) so that wheels 70, 72 and brush 58 are in contact with the floor, handle 118 is lifted to open valve 114 and allow liquid to flow out of openings 126 onto the brush, and switch 142 is closed. This causes electric current to flow to actuate brush motor 50, which via linkages 60, 62 imparts a back and forth scrubbing motion to brush 58. The device is moved over the surface to be cleaned, at whatever rate and direction may be desired to effect scrubbing and cleaning. It will be noted (see Fig. 1) that the brush is built out closely to the sides of the device, as well as being near the front, so that close approach of the brush to walls and immovable furniture and equipment is feasible. Also, the low head-room above the brush motor permits the device to run under recesses such as kick-plates. The relative positions of the bottom faces of brush 58 and wheels 70, 72 is such that, when treadle 66 is in "down" position, the tips of the bristles of the brush are somewhat lower than the bottoms of the wheels. Thus, the weight of the device is distributed over both the wheels and the brush (as well as on casters 26) so that the brush, though readily oscillated by brush motor 50, bears heavily enough on the floor to provide effective scrubbing action.

When the scrubbing action has been completed, treadle 66 is raised, as by outward pressure of the foot of the operator, thereby raising both the wheels 70, 72 and the brush 58, so that they are removed from contact with the floor.

Thereupon, squeegee 90 is lowered into contact with the floor, and with casters 26 bears the weight of the device. Switch 140 is then closed, causing electric current to flow to motor 34 thereby actuating suction blower 32. The device is then moved over the scrubbed surface to dry the same. On each forward stroke or movement, the liquid on the surface piles up in front of squeegee 90, and is sucked up into snout 80 by the action of suction blower 32.

The area of the opening between edge 87 and the floor is preferably about the same as that of snout 80, to promote effective pick-up of liquid from the floor in front of the squeegee. The cross-sectional area of snout 80 should be about the same as that of opening 84; if much larger, the pick-up of liquid through snout 80 will be less effective, and if much smaller, there is some tendency for droplets to carry all the way through to suction blower 32.

Although switches corresponding to 140 and 142 could be placed for actuation by the movement of treadle 66 as it is moved to "up" or "down" position, there is some advantage in having them in handle 27 as shown. It is desirable for the brush motor 50 to continue in operation for at least a while after the scrubbing operation is completed, so as to shake liquid off the brush 58 and avoid dribbles onto the floor during the drying operation. Hence I prefer to place both switches 140 and 142 in the handle, where the operator can manipulate them at will independently of the operation of treadle 66. In fact, both motor 34 and brush motor 50 may be in operation all the time the device is in use, without any particular disadvantage, since when the squeegee is in elevated position no water is piled up by it and none, or substantially none, is then sucked up by snout 80.

As the air and liquid mixture sucked into snout 80 emerges into chamber 82, its velocity is of course reduced since it is passing into a space of larger cross-sectional area. Some of the liquid accordingly drops out into the bottom of chamber 82. The air and liquid stream then passes through the maze of the baffle grid, whereby the remaining liquid is removed from the stream. Some of this liquid is flung out due to sudden changes in direction in flow through the grid; the rest is removed by the effect of sudden changes in velocity caused by the stream alternately flowing rapidly through perforations 99 and then slowly (with consequent settling out of droplets due to reduced speed) through sub-chambers 100. The air stream, thus freed of droplets of liquid, passes into the rear space of main chamber 82 (designated by numeral 103), and thence out through opening 84 via flexible hose 36 to suction blower 32. Thus a droplet-free stream of air is discharged from the suction blower, so that the operator of the device is not troubled by a blast of droplet-laden liquid.

The liquid separated from the air and liquid stream from snout 80 falls to the bottom of main chamber 82, where it is prevented from surging and slopping by the baffles of the grid, as already described.

When the drying operation has been completed, the main chamber 82 may be dumped by merely tilting the whole device forward, whereupon the liquid in chamber 82 runs out through snout 80. Chamber 82 may be cleaned by lifting off the liquid supply tank assembly 14, and lifting out the grid of baffles. This grid may, if desired, be made up as a separate unit and slipped into position between flanges 132 of the liquid supply tank assembly 14 with a snug sliding fit, so that it is removed when said assembly is removed (see Figs. 2 and 8).

The lift-out waste tank assembly 12 may be removed by first disconnecting flexible hose 36 from opening 84 and, if desired, also removing liquid supply tank assembly 14, after which assembly 12 is merely lifted off chassis 10.

The device of this invention may of course be used in various ways as will be obvious to those skilled in this art. Thus, it may be used for drying only, in instances where, for example, a surface has had liquid spilled on it or has been washed or wet down by a hose.

I claim:
1. A device adapted for movement over a floor surface for removal of liquid therefrom, comprising a housing constituting a main chamber, means defining a generally upwardly extending passage adjacent one end of said chamber, said passage having an intake opening so positioned as to lie immediately adjacent the floor surface and having an outlet opening into said end of said chamber, a squeegee associated with said housing and positioned adjacent the passage intake opening so as to wipe the floor surface and accumulate liquid at said intake opening, means defining a suction opening into said chamber spaced a substantial distance from the passage outlet and adapted for connection to a suction-producing device for the drawing of air and entrained liquid through said upward passage and said chamber to said suction opening, and baffle means positioned within said chamber between said passage outlet and said suction opening and comprising a plurality of vertically extending parallel plates and another plurality of vertically extending parallel plates intersecting said first-named plates, said first-named plates being perforated and said second-named plates being alternately perforated and imperforate to cause the air flowing through said chamber to repeatedly sharply change its direction of flow for precipitation of the entrained liquid therefrom, said intersecting plates providing between themselves liquid-settling spaces of large cross-sectional area compared to that of said passage.

2. A device as claimed in claim 1, wherein the baffle plates extend vertically from the bottom to the top of said chamber and are perforated only in their upper portions.

3. A device as claimed in claim 2, wherein the second-named baffle plates are arranged at right angles to said first-named baffle plates.

WILLIAM J. BELKNAP.

References Cited in the file of this patent

UNITED STATES PATENTS

| Number | Name | Date |
|---|---|---|
| 981,058 | Buhring | Jan. 10, 1911 |
| 1,263,396 | Faustini | Apr. 23, 1918 |
| 1,472,208 | Dawer | Oct. 30, 1923 |
| 1,548,839 | Henshall | Aug. 11, 1925 |
| 1,690,472 | Breton | Nov. 6, 1928 |
| 2,230,264 | Replogle | Feb. 4, 1941 |

FOREIGN PATENTS

| Number | Country | Date |
|---|---|---|
| 31,311 | France | Jan. 28, 1927 |